June 17, 1930.   F. W. BOMMER   1,764,775
THREAD CUTTING AND FORMING MACHINE
Filed July 3, 1928   2 Sheets-Sheet 1
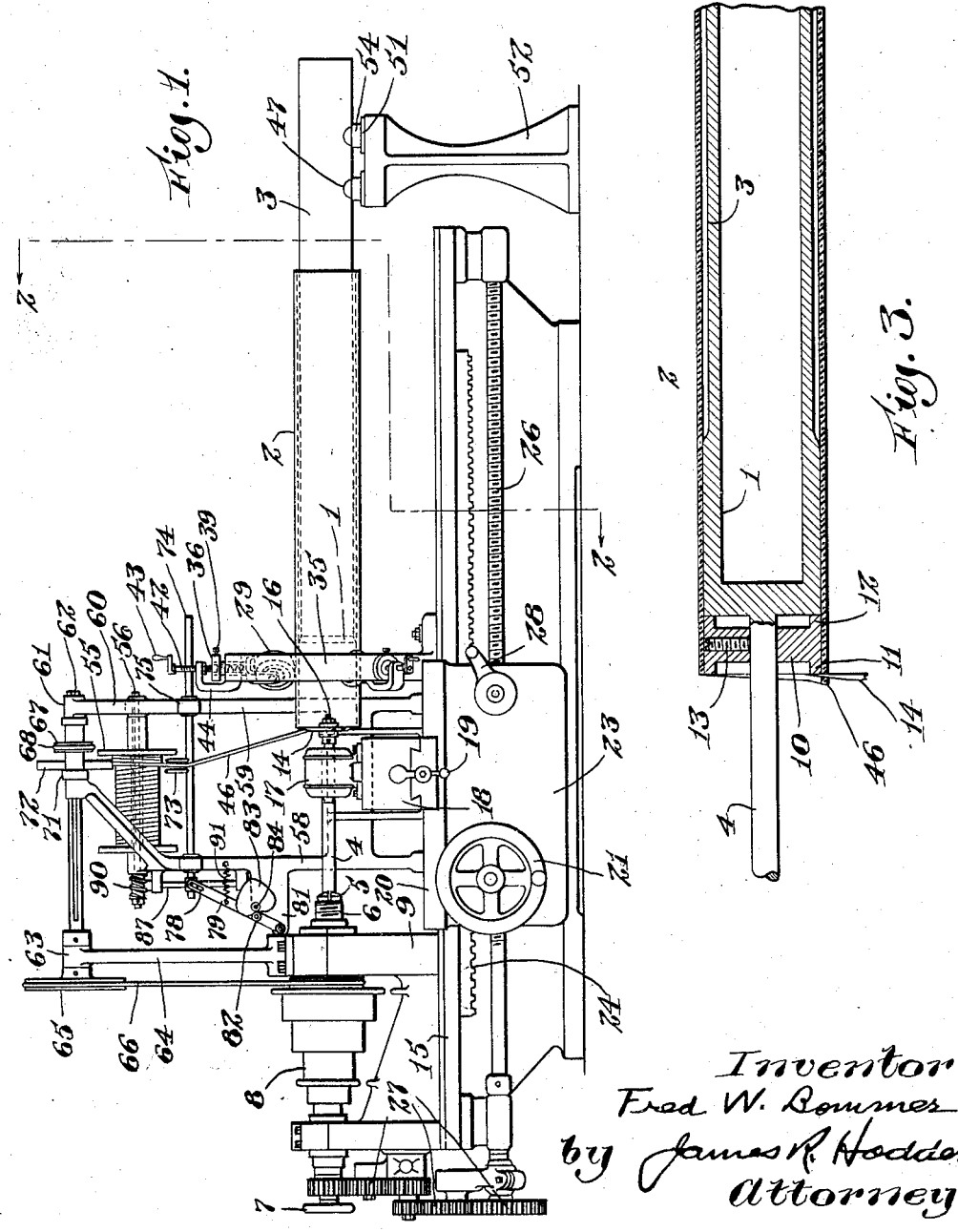
Inventor
Fred W. Bommer
by James R. Hodder
Attorney June 17, 1930.  F. W. BOMMER  1,764,775
THREAD CUTTING AND FORMING MACHINE
Filed July 3, 1928   2 Sheets-Sheet 2
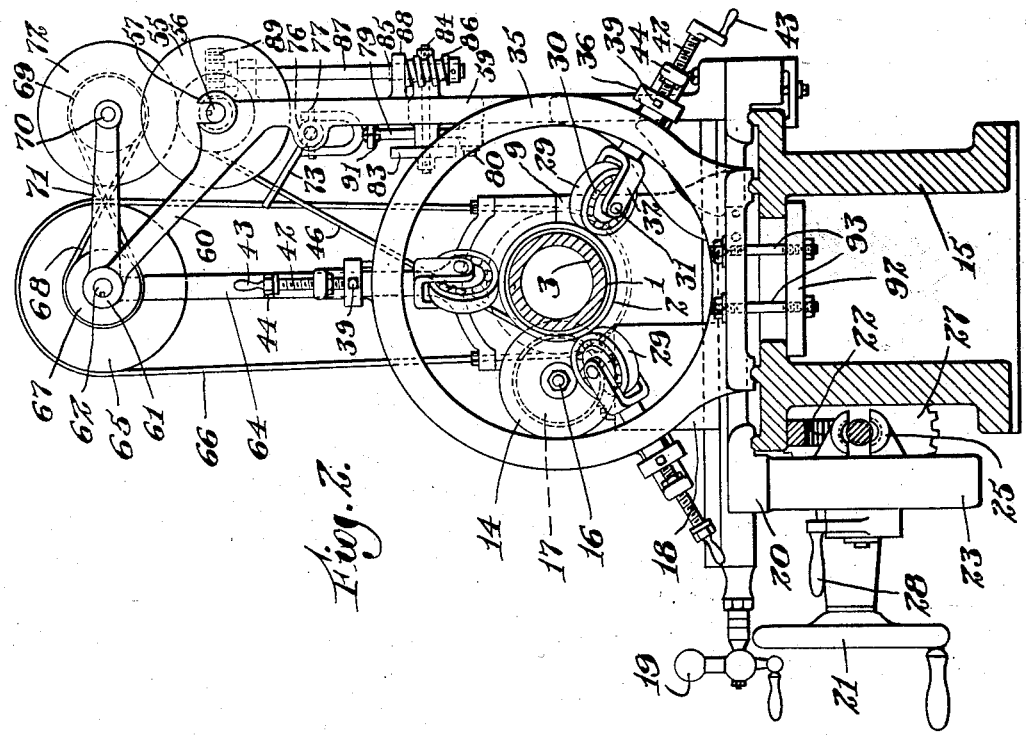
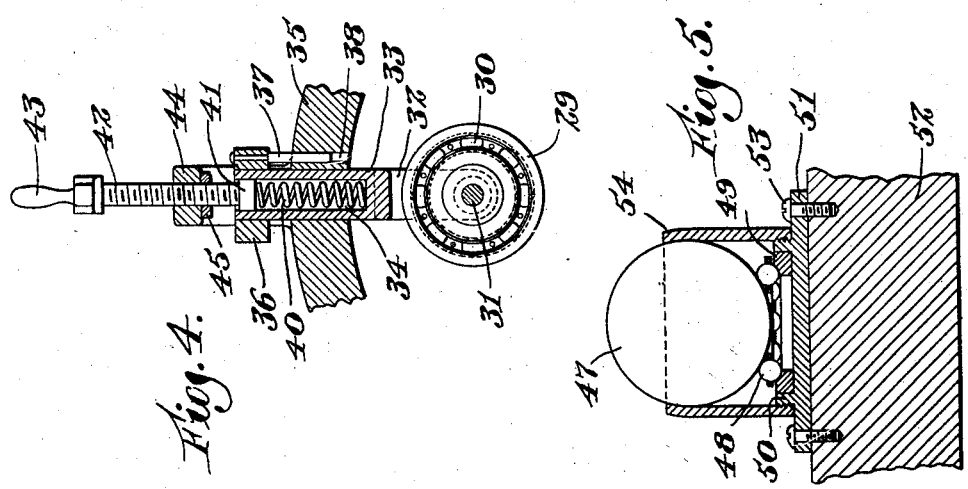
Inventor
Fred W. Bommer
by James R. Hodder
Attorney Patented June 17, 1930

1,764,775

UNITED STATES PATENT OFFICE

FRED W. BOMMER, OF EVERETT, MASSACHUSETTS

THREAD CUTTING AND FORMING MACHINE

Application filed July 3, 1928. Serial No. 290,137.

My present invention relates to novel machines for cutting or forming rubber threads.

An important object of the present invention is the provision of a machine which will be economical to manufacture, construct and assemble; also which will be simple and efficient in operation; and which will sever, cut or form a rubber thread at a high rate of speed.

Another object of the invention resides in the provision of novel mechanism whereby said rubber threads may be formed from hollow, cylindrical or tubular rubber stock.

As is well known in the art, rubber is a difficult material to cut or sever into thread formation, due to the many peculiarities of the product. Thus, when it has been attempted to make continuous threads of rubber from soft strips, it has been customary, and in fact necessary, to unite the cut portions of the thread to make a continuous strip of desired length. Also, when cutting such strips or threads from flat stock, it has been considered necessary to effect the severing operation while the rubber was under tension. This has been undesirable since, when the tension was released, the different sections of thread required to make a continuous thread of desired length, were not uniform in width, diameter or resiliency.

I have discovered, however, a novel, simple, expeditious and efficient method and mechanism for cutting rubber threads, strips or cords of great length, and in a continuous and economical manner. I have discovered that, by the utilization of rubber stock in cylindrical form, and under suitable or proper tension, I can cut from said stock, such for example as a hollow tube, indefinite lengths of rubber thread of any desired thickness, width, tension or contour-forming cross-section which may be desired, this cutting action also being at a high rate of speed.

The advantages of thus being enabled to produce a continuous thread of indefinite length, and in such an inexpensive manner, will instantly appeal to those skilled in this art.

I can utilize any form of tubular rubber stock, such as old inner tubes, from which an excellent quality of rubber thread can be produced at a minimum cost.

In carrying out my present invention, I utilize, as before stated, tubular rubber stock, this stock being drawn over a novel mandrel. This mandrel is of less diameter throughout the major portion of its length than the inside diameter of the stock, thus facilitating the traveling of the tubular stock along said mandrel. At the cutting end of said mandrel, however, the diameter thereof is preferably the same as the inside diameter of the rubber stock, so that the rubber tube will have a snug fit on the mandrel without being subjected to tension.

Said mandrel is provided with a projecting shaft adapted to be engaged in a suitable head stock or spindle, means being provided to rotate said head stock and hence said shaft and mandrel, and also the stock carried by said mandrel. The tubular stock is engaged adjacent to the cutting end of the mandrel, by a plurality of friction rollers, these friction rollers being rotated by rotation of the mandrel and stock. Means is provided to adjust the friction or pressure of said rollers upon the stock, and means is also provided to adjust the angle of said rollers relative to said stock.

Fixed on the mandrel shaft, and adapted to abut against the end of the mandrel, is a cutting or shearing member, in the form of a collar, against which a circular rotary knife is adapted to abut. This collar has a relatively thin shearing edge against which the knife bears, the collar thus wearing evenly and squarely with relation to the mandrel.

Thus the shearing edge need not be squared off or trued. This collar is reversible, having two identical shearing surfaces, so that when one shearing edge is worn down, the collar may be reversed and the second shearing edge brought into enagement with said knife, thus further increasing the efficiency, economy, and long life of my novel machine.

By varying the pressure of the friction rollers, and also by varying the angle of same, any desired width of rubber thread can be produced from the tubular rubber stock.

The rotary cutting knife is adjustable laterally of the mandrel, and is also adjustable longitudinally thereof, to compensate for wear on the shearing edges.

After the rubber thread is formed or severed from the tube, it is conducted to and wound on a suitable spool or reel, friction means being provided to accomplish this winding operation, and automatically operable means being provided to insure the winding of said thread upon its spool in level layers.

The above and other objects of the invention, details of construction, features, combinations of parts and advantages, will be hereinafter more fully pointed out, described and claimed.

I believe that my present machine, adapted to cut a continuous rubber thread from tubular stock, as above briefly described, is novel, and I have therefore claimed the same broadly in the present application.

The ease and speed of operation, as well as the advantages to be derived from the use of my novel machine, will instantly be apparent to those skilled in this art.

Referring to the drawings, illustrating a preferred embodiment of the present invention, Fig. 1 is a side elevation of a novel machine embodying my invention;

Fig. 2 is a vertical sectional view on the line 2—2 of Fig. 1;

Fig. 3 is a longitudinal sectional view of my novel mandrel, illustrating the relation of the reversible shearing collar and knife to the mandrel and to each other;

Fig. 4 is a cross-sectional detail view, on an enlarged scale, of one of the friction rollers and of the means for operating the same; and Fig. 5 is a vertical sectional view of one of the mandrel supporting members.

Referring now to the drawings, for a particular description of the invention, its construction and operation, 1 designates my novel mandrel, which is preferably smooth and is also preferably of the same diameter as the inside diameter of the tubular rubber stock 2 drawn thereover. This mandrel is reduced in diameter, as at 3, throughout the major portion of its length, to facilitate the travel of the stock 2 thereover, without binding or jamming. When the stock 2 is drawn over the mandrel 1, it will have a snug fit thereon, without, however, being under or subjected to tension.

The mandrel 1 has a projecting shaft 4, preferably integral therewith, said shaft being held in a chuck 5 in the spindle 6. This spindle 6 is carried in the support 9 on a bed 15, and is adjusted by means of a hand wheel 7. Rotation is imparted to the spindle 6, and hence to the shaft 4 and mandrel 1 by means of cone pulleys 8 driven from any suitable source of power, (not shown).

Abutting against the end of the mandrel 1 and secured to the shaft 4 by a set screw 13, is a collar 10 having shearing edges 11 and 12, this collar being reversible by releasing the set screw 13, sliding the collar 10 off the shaft 4 and reversing the same. Whichever of the shearing edges 11 or 12 is faced away from the mandrel 1 is adapted to be engaged by the circular rotary knife 14, mounted on the shaft 16 of a motor 17 and driven thereby. The knife is mounted to lie flat against the shearing edges 11 or 12, the motor 17 being carried on a cross-slide 18, movable laterally of the bed 15 by a handle 19 to adjust the knife 14 toward or from the work. The knife 14 is adjustable longitudinally of the machine by means of a saddle 20 on which the cross-slide 18 is mounted. This saddle is manually operable by means of an apron hand wheel 21 controlling a pinion 22 on the opposite side of the apron 23, said pinion engaging a rack 24 to move the saddle longitudinally of the bed 15, and hence to move the knife 14 toward or from the collar 10. Should it be desired to move the saddle longitudinally of the machine in the usual manner, this can be accomplished by closing the nut cam 25 on the lead screw 26, this lead screw being rotatable through the gears 27 which in turn are operated by the pulleys 8. Said nut cam is operable by means of a handle 28 in the usual manner.

As the mandrel 1 is rotated in the manner above described, the tubular rubber stock 2 carried thereby will also be rotated, and in order to feed the stock 2 along the mandrel, so that it may be presented to the knife 14 to be cut, I have provided a plurality of friction feeding members now to be described.

Each of these friction feeding members or devices comprises a roller 29 which is rotated by rotation of the mandrel, and stock 2. This roller 29 is mounted around a ball bearing 30 carried on a shaft 31 in the yoked end 32 of a holder 33 having a recess or chamber 34 therein. This holder 33 is slidably mounted in an aperture in a yoke 35 mounted on the bed 15. Surrounding the upper end of the holder 33 is a ring or nut 36 having a pin 37 fixed thereto and slidably fitted in a slot 38 in the yoke 35 to prevent rotation of the nut 36. The holder is held against rotation in the nut 36 by means of a set screw 39. Thus, as the stock 2 rotates, should any unevenness therein be encountered by the rollers 29, said rollers, and their holders 33, will be automatically raised or lowered through the yoke 35.

Pressure of the rollers 29 on the tubular rubber stock 2 may be varied by means of a spring 40 fitted within the chamber 34 and engaged by a disc or plunger 41 on the end of a threaded shaft 42 carrying a crank 43. Rotation of the crank 43 will thread the shaft 42 through the support 44 affixed to the yoke 35 to increase or decrease pressure of the roller 29 on the stock 2. A lock nut 45 is provided adjacent to the support 44 to hold the shaft 42 in adjusted position.

Rotation thus being imparted to the mandrel 1 and stock 2, the rollers 29 will also be caused to rotate, and being set at an angle to the stock 2, will feed the same toward the knife 14, severing from the stock 2 a rubber thread 46.

By changing the angle of the rollers 29 relative to the stock 2, as well as by changing or varying the pressure of said rollers on said stock, the speed of travel of said stock along the mandrel 1 can be so arranged as to effect the severing of a thread of any desired or predetermined width.

As the shearing edge 11 wears, the knife 14 may be adjusted by means of the hand wheel 21 to keep said knife in constant contact with said shearing edge. When the edge 11 is completely worn down, the collar 10 can be reversed, in the manner above described, and the shearing edge 12 brought into engagement with the knife 14. The edges 11 and 12 will, of course, be hardened to increase their wearing capacity.

I provide a novel support for the mandrel 2, comprising a plurality of balls 47 resting on a ball bearing 48 which in turn rests or works on a race 49 mounted inside of a flange 50 on a plate 51. This plate 51 is fixed to a standard 52 by means of screws 53, the balls 47 being held in place by a casing 54 threaded to the outside of the flange 50. These balls 47 will thus have a universal movement, and will support the mandrel in an efficient manner, without any jamming, or without impeding the rotation of said mandrel, there being four of these balls, two in front and two behind.

As the thread 46 is severed, it is conducted to and wound on a spool 55 mounted on a shaft 56, said shaft being carried in the yoked ends 57 of standards 58 and 59. The standards 58 and 59 have inwardly and upwardly extending arms 60 having bearings 61 at their upper ends and in these bearings is a shaft 62. This shaft 62 extends through a bearing 63 in the upper end of a standard 64 mounted on the support 9.

One end of this shaft carries a pulley 65 rotated by a belt 66 from the cone pulleys 8, thus imparting rotation to the shaft 62. Splined to the shaft 62 is a sleeve carrying a pulley 67 carrying a belt 68 running to a pulley 69 on a shaft 70 carried in the outer ends of rocker arms 71 rotatably mounted on the shaft 62. On the shaft 70 also is a friction roller 72 adapted to ride on the thread 46 on the spool 55. Rotation thus being imparted to the roller 72, the same will rotate the spool 55 in predetermined timed relation to the severing of the thread, so that the thread 46 will not be under tension as it is wound, thus insuring uniform width of the thread throughout its entire length.

In order to insure winding of the thread 46 in level layers on the spool 55, I provide guide rods 73 on a shaft 74 slidably mounted in bosses 75 on the standards 58 and 59. This shaft carries, at one end, a collar 76 having a pin 77 adapted to enter slots 78 in the yoked end of a lever 79. Said lever 79 is pivoted at its lower end, at 80, to a lug 81 on the standard 58 and carries a roller 82 adapted to be engaged by a cam 83 mounted on a pin 84, said pin carrying, on the end opposite the cam 83, a pinion 85 adapted to be engaged by a worm 86 on a vertical shaft 87 carried in bosses 88 on the standard 58. On the upper end of this shaft 87 is a pinion 89 adapted to be engaged and rotated by a worm 90 on the shaft as said shaft is rotated by the friction roller. Rotation thus being imparted to the cam 83, the lever 79 will be moved to the left, Fig. 1, against the tension of a coiled spring 91, and will be moved to the right by said coiled spring 91, thus moving the shaft 74 alternately to the left and right, Fig. 1, and the thread 46, passing through the guides 73, will be fed to the spool in such a manner that said thread will lie in level layers thereon.

The simplicity, ease of operation, speed of thread production, and efficiency of my novel machine will instantly appeal to those skilled in this art. The operation of my said novel machine is simple, and will be readily understood, being briefly described as follows:

Stock 2 is drawn over the mandrel 1, and the rollers 29 are set to desired angle and pressure in accordance with the predetermined width of thread desired to be formed. The position of the yoke 35 on the bed 15 can be adjusted, if desired, by means of a bracket 92 and bolts 93. Power is then transmitted to the pulleys 8, which effects rotation of the spindle 6, shaft 4 and mandrel 1, as well as the stock 2 carried thereby. The knife 14 will also be rotated, by its motor 17, and the thread cutting operation will commence. The thread is conducted through the guides 73 and to the spool 55. Simultaneously rotation is imparted to the shaft 62, by means of the belt 66 and pulley 65, and rotation will also be imparted to the friction roller 72 by means of the belt 68. The friction roller will engage the thread 46, and cause rotation of the spool 55, winding the thread thereon. Simultaneously the level winding guides 73 will be actuated to the left and right, in the manner above described, to insure winding of the thread 46 in level layers on its spool 55. When the spool 55 is filled to desired or intended capacity, the shaft 56 may be raised from the yoked ends 57 of the standards 58 and 59, and the spool 55 removed longitudinally thereof, whereupon a new or empty spool may be replaced in place thereof. The friction roller 72 may either be raised manually on the rocker arms 71 out of the way of the spool 55 when it is desired to remove the same, or the action of raising the shaft 56 will effect an elevating of the roller 72.

Thus my novel machine will produce a continuous rubber thread, of desired length, width and thickness, and with or without tension applied thereto, of indefinite length, in a rapid, efficient, and expeditious manner. In the preferred method of production, no tension will be applied to the thread or to the rubber stock being cut.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a machine of the kind for cutting a continuous thread or strip from a tubular body of rubber or like elastic material, a mandrel adapted to engage said body, means to rotate said mandrel, a cutting knife, means to feed said stock along said mandrel into position to be severed into a continuous thread by said knife, and a member affixed to said mandrel and having reversible shearing edges adapted to be engaged by said knife.

2. In a machine of the kind for cutting a continuous thread or strip from a tubular body of rubber or like elastic material, a mandrel adapted to engage said body, means to rotate said mandrel, a cutting knife, means to feed said stock along said mandrel into position to be severed into a continuous thread by said knife, a member affixed to said mandrel and having reversible shearing edges adapted to be engaged by said knife, and means to move said knife laterally of said mandrel.

3. In a machine of the kind for cutting a continuous thread or strip from a tubular body of rubber or like elastic material, a mandrel adapted to engage said body, means to rotate said mandrel, a cutting knife, means to feed said stock along said mandrel into position to be severed into a continuous thread by said knife, a member affixed to said mandrel and having reversible shearing edges adapted to be engaged by said knife, and means to move said knife longitudinally of said mandrel.

4. In a machine of the kind for cutting a continuous thread or strip from a tubular body of rubber or like elastic material, a mandrel adapted to engage said body, means to rotate said mandrel, a cutting knife, means to feed said stock along said mandrel into position to be severed into a continuous thread by said knife, a member affixed to said mandrel and having reversible shearing edges adapted to be engaged by said knife, means to move said knife longitudinally of said mandrel, and means to move said knife laterally of said mandrel.

5. In a machine of the kind for cutting a continuous thread or strip from a tubular body of rubber or like elastic material, a mandrel adapted to carry tubular rubber stock, means to rotate said mandrel and said stock, a cutting device, a shearing member on said mandrel cooperating with said cutting device, a plurality of pressure rollers adapted to bear on said stock and operable by rotation of said stock to feed said stock toward said cutting device, and means to vary the pressure of said rollers on said stock.

6. In a machine of the kind for cutting a continuous thread or strip from a tubular body of rubber or like elastic material, a mandrel adapted to carry tubular rubber stock, means to rotate said mandrel and said stock, a cutting device, a shearing member on said mandrel cooperating with said cutting device, a plurality of pressure rollers adapted to bear on said stock and operable by rotation of said stock to feed said stock toward said cutting device, and means to vary the angle of said rollers relative to said stock.

7. In a machine of the kind for cutting a continuous thread or strip from a tubular body of rubber or like elastic material, a mandrel adapted to carry tubular rubber stock, means to rotate said mandrel and said stock, a cutting device, a shearing member on said mandrel cooperating with said cutting device, a plurality of pressure rollers adapted to bear on said stock and operable by rotation of said stock to feed said stock toward said cutting device, means to vary the pressure of said rollers on said stock, and means to vary the angle of said rollers relative to said stock, whereby a rubber thread of predetermined width may be severed from said tubular stock.

8. In a machine of the kind for cutting a continuous thread or strip from a tubular body of rubber or like elastic material, a mandrel adapted to engage said body, means to rotate said mandrel, a cutting knife, means to feed said stock along said mandrel into position to be severed into a continuous thread by said knife, a member affixed to said mandrel and having reversible shearing edges adapted to abut against said knife in a direction perpendicular to the plane of said knife, and means to move said knife longitudinally of said mandrel.

9. In a machine of the kind for cutting a continuous thread or strip from a tubular body of rubber or like elastic material, a mandrel adapted to engage said body, means to rotate said mandrel, a cutting knife, means to feed said stock along said mandrel into position to be severed into a continuous thread by said knife, a member affixed to said mandrel and having reversible shearing edges adapted to abut against said knife in a direction perpendicular to the plane of said knife, and means to move said knife longitudinally of said mandrel, whereby the said shearing edges will be constantly even, regardless of the wear thereon.

10. In a machine for cutting a continuous thread or strip from a tubular body of rubber or like elastic material, the combination with a mandrel engaging said tubular body and presenting a shearing edge underlying the same, of means for rotating said mandrel, a cutting knife having a shearing edge maintained in contact with the shearing edge of said mandrel, and means to feed said tubular body progressively lengthwise and on said mandrel toward the knife to be severed thereby into a continuous, helical thread or strip.

11. In a machine for cutting a continuous thread or strip from a tubular body of rubber or like elastic material, the combination with a mandrel over which said tubular body passes, said mandrel presenting a shearing edge underlying said tubular body, of a rotary cutting knife having a shearing edge maintained in contact with the shearing edge of said mandrel, means to rotate said knife, means to rotate the mandrel to carry the tubular body beneath the cutting knife, and friction means engaging the tubular body to feed the same progressively lengthwise and on the mandrel toward the knife to be severed thereby into a continuous thread or strip.

12. In a machine for cutting a continuous thread or strip from a tubular body of rubber or like elastic material, the combination with a mandrel over which said tubular body passes, said mandrel presenting a shearing edge underlying said tubular body, of a rotary cutting knife having a shearing edge maintained in contact with the shearing edge of said mandrel, means to rotate said knife, means to rotate the mandrel to carry the tubular body beneath the cutting knife, and a freely rotatable friction member engaging the tubular body and rotated by the mandrel-caused movement thereof, said friction member serving to feed said tubular body progressively lengthwise and on the mandrel toward the knife to be severed thereby into a continuous thread or strip.

In testimony whereof, I have signed my name to this specification.

FRED W. BOMMER.